Jelle Hekman
INVENTOR

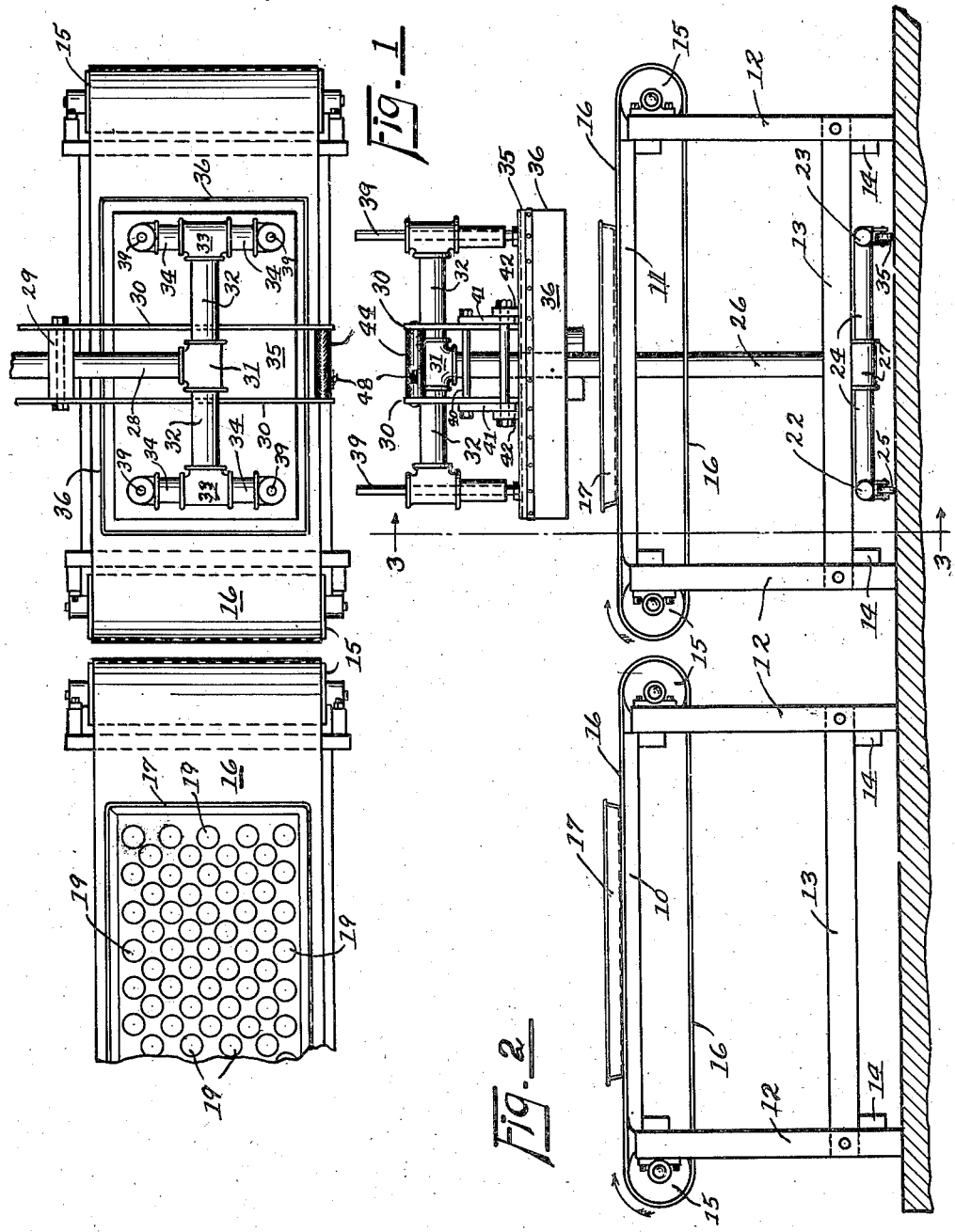

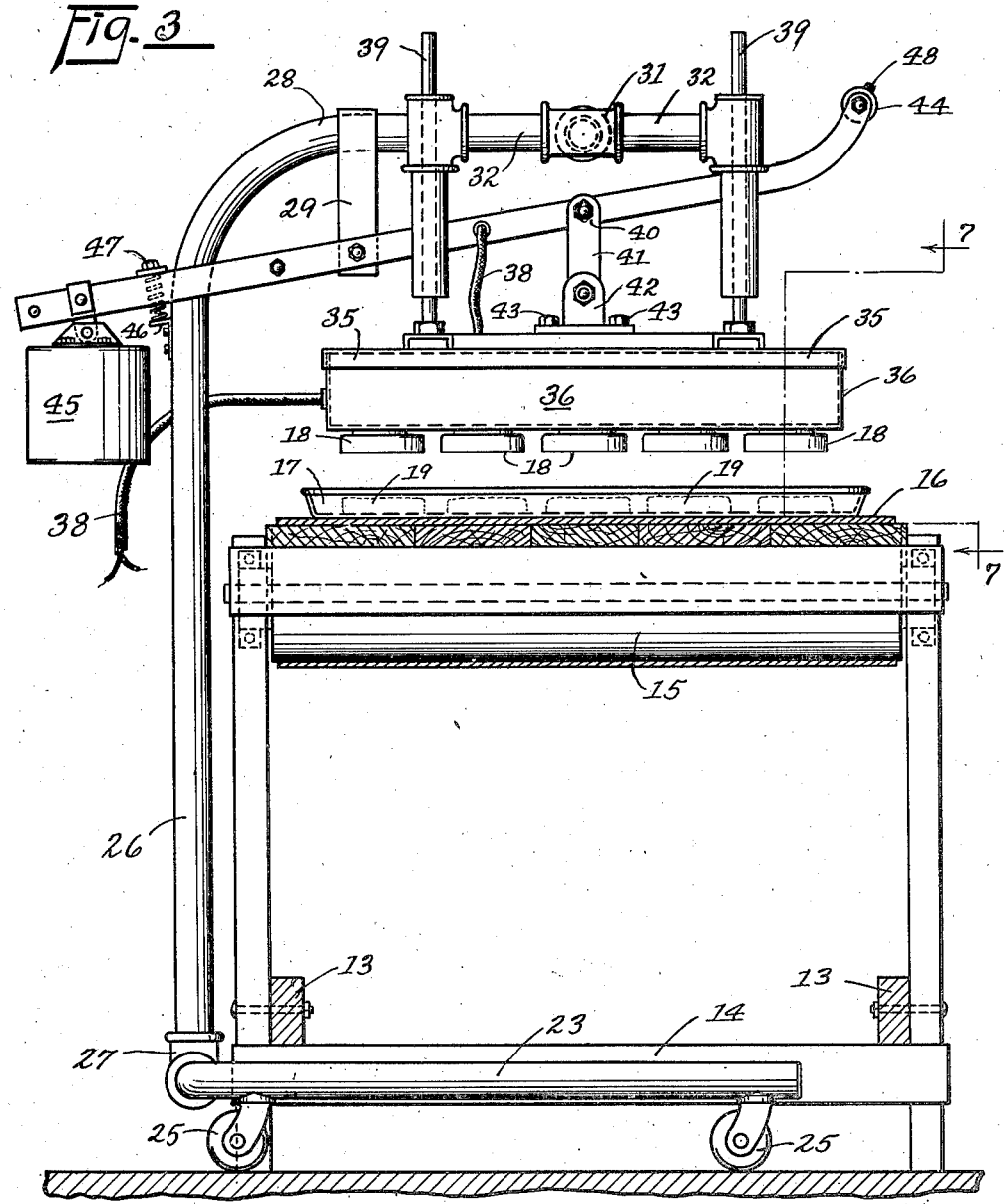

Patented Jan. 29, 1946

2,393,682

UNITED STATES PATENT OFFICE 2,393,682

ARTICLE HANDLING APPARATUS

Jelle Hekman, Grand Rapids, Mich., assignor to Dutch Tea Rusk Company, Holland, Mich., a corporation of Michigan Application January 1, 1944, Serial No. 516,675

1 Claim. (Cl. 214—1)

The present invention relates to electro-magnets and more particularly to an electro-magnetically operated device for lifting from, or placing upon a tray, a plurality of metal cups, containers or the like during the travel of a train of trays on a conveyer moving below the magnetic field of the device.

The primary objects of the instant invention are to provide an electro-magnetically operated device of the general character above indicated which is particularly well adapted for use in a bakery wherein baked doughs or batters within metal cups or containers disposed on trays carried on a conveyer and traveling below the magnetic field may be lifted from the trays, leaving the baked goods lying upon the tray; to provide such a device which will replace such lifted cups or containers removed from one tray of a train of trays traveling on the conveyer onto the following tray of the train; to provide such a device which will electro-magnetically function in the manner above indicated to thereby obviate manual labor and thus accelerate operation; and, to provide such an electro-magnetically operated device which is utilitarian, efficient and economical in its intended use.

An illustrative embodiment of the invention is shown in the accompanying drawings, wherein:

Figure 1 is a top plan view of the electromagnetically operated device disposed in cooperative relationship with a conveyer designed to travel a train of trays, each alternate tray of the train supporting a plurality of spaced inverted cups, each cup covering a baked dough or batter on a tray traveling on the conveyer and passing below the magnetic field of the device;

Figure 2 is a side elevational view thereof;

Figure 3 is an enlarged end elevational view of the electro-magnetically operated device disposed in such cooperative relationship with the conveyer, its electro-magnetic table being shown in its normal elevated position with the cups which covered the baked doughs on the tray having been lifted therefrom and clinging thereto;

Figure 4:
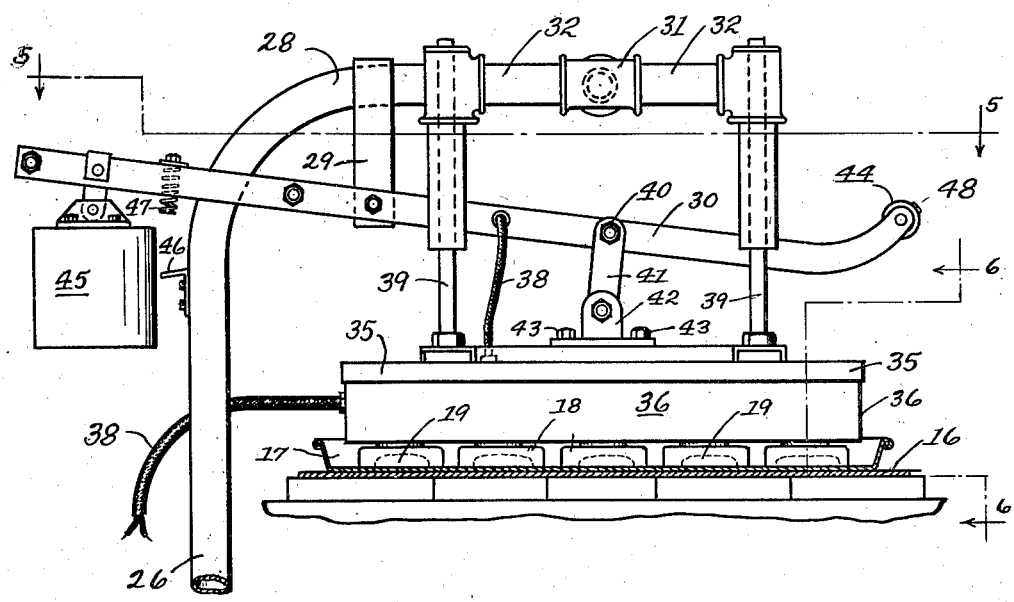
Figure 4 is a fragmentary end elevational view, similar to that shown in Figure 3 but showing the electro-magnetic table in its manually depressed position preparatory to releasing the plurality of cups over unbaked doughs supported on a following tray traveling on a conveyer and moving under the magnetic field of the device.
Figure 5:
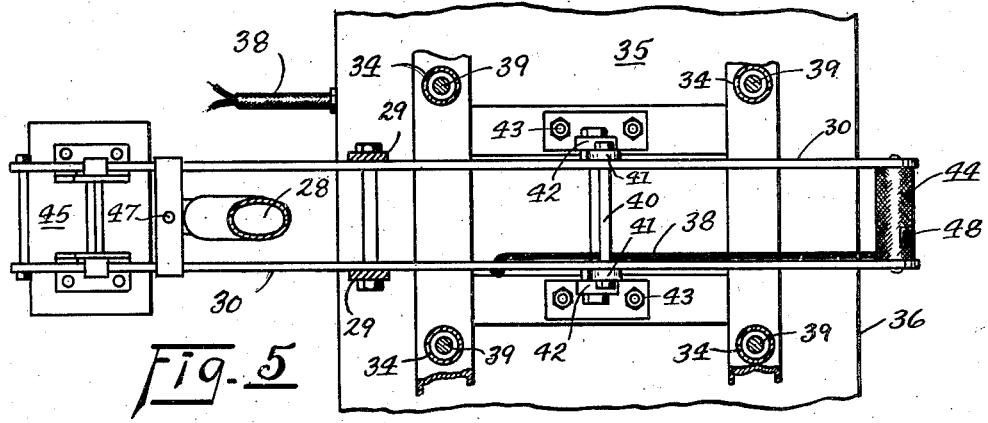
Figure 5 is a sectional view thereof on line 5—5 of Figure 4.

Referring then to the drawings wherein like parts of the electro-magnetically operated device and its associated conveyers are designated by the same numerals in the several views, a pair of tables disposed end to end and each generally designated 10, 11, are both supported by legs 12 secured adjacent their feet by struts 13, 14 to provide for structural rigidity. The opposite ends of each table 10, 11 are provided with rollers 15 mechanically rotatable by any suitable power means, not shown, the oppositely disposed rollers on each table carrying an endless belt 16 forming a conveyer for supporting and traveling a train of trays 17 in the direction indicated by the arrows in Figure 2.

Trays supporting inverted metal cups 18 within which doughs or batters 19 have been baked, are removed from the bakery oven, not shown, and placed on the forward end of the conveyer belt 16 of the table 10 which forward end is disposed forwardly of the oven door. A tray supporting raw doughs or batters formed and spaced thereon by means of the form 20 previously placed on the tray and into whose wells 21 the raw dough or batter has been poured after which pouring the form is then removed from the tray, is next placed on the conveyer belt immediately following said first tray and after the former has been travelled by the conveyer belt a sufficient distance to permit such placement.

A train of trays, alternately made up in the manner above indicated, is thus travelled by the conveyer belt rotatably supported on table 10 to the conveyer belt rotatably supported on table 11, all as indicated by the directional arrows shown in Figure 2.

An electro-magnetically operated device for alternately lifting the metal cups 18 covering their baked doughs or batters and for thereafter covering the raw doughs or batters spacedly disposed on the following tray, as the train of trays is travelled on the conveyer belts, comprises a mobile carriage having a pair of spaced parallel, horizontally disposed feet 22, 23, here shown as formed of tubular stock and integrally connected at their forward ends by the transverse portion 24 which spaced feet are each supported by a pair of spaced castors 25.

A vertically disposed post 26, secured medially of the transverse portion 24 by means of the T-shaped coupling 27, is turned rearwardly-horizontally at its upper end to provide a hanger 28 from which is suspended a clevis 29 whose opposite ends are pivotally connected with a pair of spaced parallel arms 30 which arms are disposed on opposite sides of the vertical post 26 and are vertically tiltable relative thereto.

The forward end of the hanger 28 is provided with a T-shaped coupling 31 from each of whose opposite sides an arm 32 is secured and which oppositely disposed arms 32 project horizontally and transversely of the hanger 28. The outer end of each arm 32 is here shown as provided with a T-shaped coupling 33 from each of whose opposite sides an arm 34 projects in parallelism with the hanger 28 and on opposite sides thereof, the outer end of each arm 34 being provided with a vertical bore, each forming a bearing for the purpose hereinafter set forth.

A horizontally disposed plate 35 having depending flanges 36 has suspended from its under side a plurality of rows of spaced electro-magnets 37 adapted to be electro-magnetically energized by an electric current flowing through the wiring 38 connected in parallel with each electromagnet and from a suitable source of electric power. The upper surface of the plate 35 is provided with four spacedly disposed, vertical rods 39 in registration with the vertical bores of the four arms 34 and within which bores which form bearings, the rods 39 are adapted for vertical reciprocal movement.

The spaced parallel arms 30, intermediate their outer ends and the clevis 29, are pivotally connected to a pin 40 having a pair of spaced depending links 41 each pivotally connected to an upstanding bracket 42, each secured to the upper surface of the plate 35 as by the bolts 43. The forward ends of the arms 30 are provided with a handle 44 disposed and secured transversely therebetween for depressing the plate for purposes hereinafter described.

A counterweight 45 is pivotally suspended from the rear ends of the spaced parallel arms 30 for normally elevating the plate 35 to its position shown in Figure 3 which plate however may be depressed to its position shown in Figure 4 and a bracket 46 secured to the rearward side of the vertical post 26 is preferably provided for engaging the lower end of the coiled expansion spring 47 which is secured between the spaced arms 30 and which spring cushions the shock in instances wherein the plate 35 is permitted to return from its position shown in Figure 4 to its normal position shown in Figure 3.

Means for energizing the plurality of electromagnets comprises the manually operable switch button 48 disposed transversely of the handle 44 which switch button is within the electric circuit, generally designated 38, connected with a suitable source of electric power.

*Operation*

In operation, trays 17 supporting the metal cups 18 within which doughs or batters 19 have been baked, are removed from the bakery oven and placed on the forward end of the conveyer belt 16 of the table 10. A tray supporting raw doughs or batters formed and spaced thereon by means of the form 20 as hereinbefore described, is next placed on the conveyer belt 16 immediately following said first tray and after the former has been travelled by the conveyer belt a sufficient distance to permit such placement.

Figure 6:
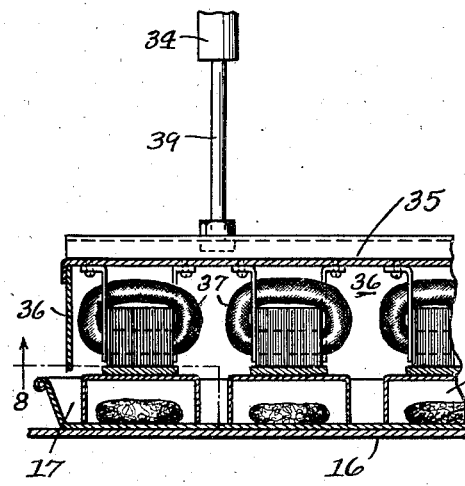
Figure 6 is a sectional view on line 6—6 of Figure 4.
Figure 7:
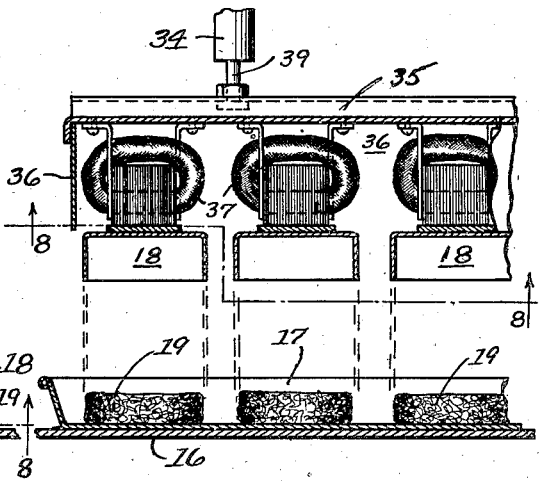
Figure 7 is a sectional view on line 7—7 of Figure 3.
Figure 8:
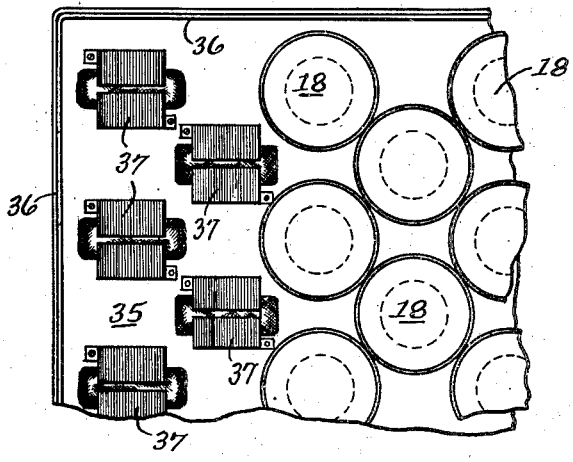
Figure 8 is a sectional view on lines 8—8 of Figures 6 and 7.
Figure 9:
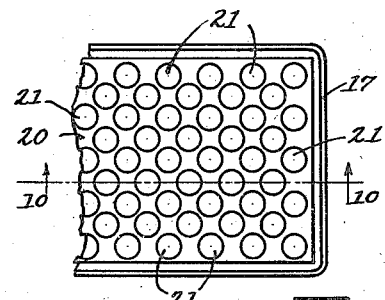
Figure 9 is a form seated on a tray within which form individual doughs or batters are formed and spaced from each other on the tray.
Figure 10:
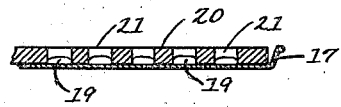
Figure 10 is a sectional view thereof on line 10—10 of Figure 9.

A train of trays, alternately made up in the above manner, is thus travelled by the conveyer belt rotatably supported on table 10 to the conveyer belt rotatably supported on table 11. When the first tray has moved to a position below the electro-magnetically operated device, the handle 44 is manually depressed, lowering the plate 35 from its normal position shown in Figures 3 and 7 to its position shown in Figures 4 and 6 at which time the switch 48 is closed by the manual manipulation of the operator. Closing of the switch 48 closes the electric circuit which energizes the several electro-magnets 37. The metal cups 18 are thus attracted by their respective electromagnets which, when the handle is released, results in a movement of the plate 35 from its position shown in Figures 4 and 6 to its normal position shown in Figures 3 and 7.

When the following tray which supports the raw doughs moves to a position below the plate 35, the handle is again depressed and the electromagnets de-energized, permitting the metal cups to drop over the unbaked doughs or batters which tray is then removed and placed in the oven.

This alternate operation is continued until the day's baking has been completed, it being understood that empty trays are substituted for those supporting raw doughs or batters after the last batch thereof has been formed and on which empty trays, the metal cups which have been lifted from the baked doughs on the preceding tray, are deposited.

It will thus be seen that the electro-magnetically operated device herein shown and described is utilitarian, efficient and economical in its intended use and while but one specific embodiment of the invention has been herein shown and described, it will be understood that certain details of the device shown may be altered or omitted without departing from the spirit of the invention as the same is defined by the following claim.

I claim:

A device of the class described comprising a vertically disposed post whose upper end is laterally turned to form a hanger, said hanger having a pair of spaced vertical bores disposed on opposite sides of said laterally turned portion of said post, each bore forming a bearing, an arm pivotally suspended from the horizontally disposed portion of said post having a plate pivotally suspended therefrom provided with a plurality of spacedly disposed electro-magnets secured to the under surface thereof and said plate having four spaced, vertically extending members, each disposed in one of said bearings, a handle adjacent one end of said arm, a counterweight adjacent the opposite end of said arm for normally maintaining the plate in elevated position, and means for energizing said electro-magnets whereby a plurality of metal objects similarly spacedly disposed with reference to the disposition of said electro-magnets may be respectively attracted in instances wherein said plate has been depressed and to lift them when said plate is thereafter permitted to return to its normally elevated position.

JELLE HEKMAN.